(12) United States Patent
Jones et al.

(10) Patent No.: US 9,030,348 B2
(45) Date of Patent: May 12, 2015

(54) SYSTEMS AND METHODS FOR PROVIDING DIVERSITY-DISTANCE-MEASURING EQUIPMENT

(75) Inventors: James B. Jones, Carnation, WA (US);
Ruy C. Brandao, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 303 days.

(21) Appl. No.: 13/545,530

(22) Filed: Jul. 10, 2012

(65) Prior Publication Data

US 2014/0015707 A1      Jan. 16, 2014

(51) Int. Cl.
  *G01S 13/08*     (2006.01)
  *G01S 13/78*     (2006.01)

(52) U.S. Cl.
  CPC ..................... *G01S 13/785* (2013.01)

(58) Field of Classification Search
  CPC .................................................... G01S 13/785
  USPC ........................................................... 342/47
  See application file for complete search history.

(56) References Cited

U.S. PATENT DOCUMENTS

| | | | |
|---|---|---|---|
| 3,375,516 A | | 3/1968 | Hart et al. |
| 4,531,235 A | * | 7/1985 | Brusen ........................ 455/273 |
| 6,768,445 B1 | | 7/2004 | Johnson |
| 7,583,223 B2 | * | 9/2009 | Brandao et al. ................ 342/30 |
| 2007/0040687 A1 | | 2/2007 | Reynolds |
| 2008/0238759 A1 | | 10/2008 | Carocari et al. |

OTHER PUBLICATIONS

Examination Report from counterpart European patent application No. 13173589.6, dated Oct. 28, 2013, 6 pp.
Response to Examination Report dated Oct. 28, 2013, from counterpart European application No. 13173589.6, filed Feb. 20, 2014, 13 pp.
European Search Report from counterpart European patent application No. 13173589.6, dated Oct. 15, 2013, 3 pp.

* cited by examiner

*Primary Examiner* — Timothy A Brainard
(74) *Attorney, Agent, or Firm* — Shumaker & Sieffert, P.A.

(57) ABSTRACT

Systems and methods that allow for distance-measuring equipment (DME) to use either a lower or an upper fuselage-mounted antenna. An exemplary system located on an aircraft includes an aircraft configuration data source that generates aircraft configuration information, an aircraft orientation data source that generates aircraft orientation information, a positioning system that generates aircraft position information and a component that provides DME ground station position information. The system also includes a first antenna, a second antenna and a processing device that determines if a DME signal communication issue exists with the first antenna that is based on the generated aircraft position information, the DME ground station position information and at least one of the configuration or orientation information. The processing device switches DME signal communication to the second antenna if a DME signal communication issue has been determined to exist.

20 Claims, 3 Drawing Sheets

SYSTEMS AND METHODS FOR PROVIDING DIVERSITY-DISTANCE-MEASURING EQUIPMENT

BACKGROUND OF THE INVENTION

Distance-measuring equipment (DME) is currently installed on aircraft for use with a single antenna mounted under the fuselage. In some situations, the lower mounted DME antenna may not provide adequate communication with a DME ground station because line of sight to the DME ground station is compromised. The lack of line of sight can be due to the attitude and orientation of the ownship (e.g., the ownship has turned so that the lower antenna is turned away from the DME ground station or the landing gear doors provide an obstacle).

Also, use of the lower mounted DME antenna might not be possible, due to a failure in the antenna or cabling from the avionics to the antenna.

SUMMARY OF THE INVENTION

The present invention provides systems and methods that allow for distance-measuring equipment (DME) to use either a lower or an upper fuselage-mounted antenna. When the lower antenna is not appropriate (due to failure or line-of-sight issues) then the upper antenna is selected.

An exemplary system located on an aircraft includes an aircraft configuration data source that generates aircraft configuration information, an aircraft orientation data source that generates aircraft orientation information, a positioning system that generates aircraft position information and a component that provides DME ground station position information. The system also includes a first antenna, a second antenna, and a processing device that determines if a DME signal communication issue exists with the first antenna that is based on the generated aircraft position information, the DME ground station position information, and at least one of the configuration or orientation information. The processing device switches DME signal communication to the second antenna if a DME signal communication issue has been determined to exist.

In one aspect of the invention, the first antenna is located on a lower surface of a fuselage of the aircraft and the second antenna is located on an upper surface of the fuselage of the aircraft.

In one aspect of the invention, the aircraft configuration information includes landing gear position information and the orientation information includes at least one of pitch, roll, or heading information.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
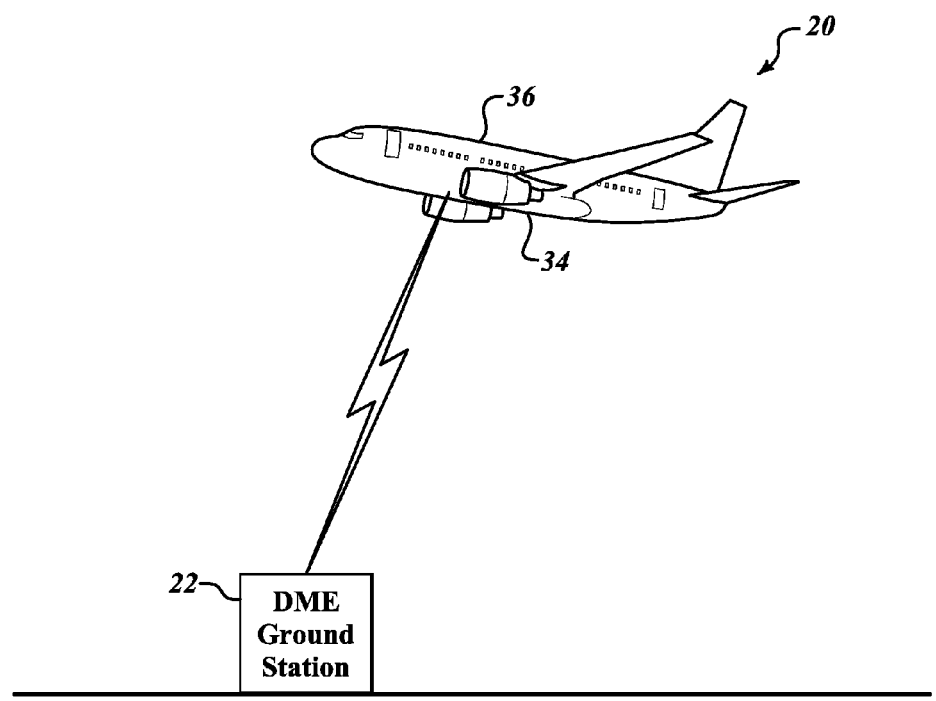
FIG. 1 is a diagram of an aircraft performing DME communication with a ground station in accordance with an embodiment of the present invention.
Figure 2:
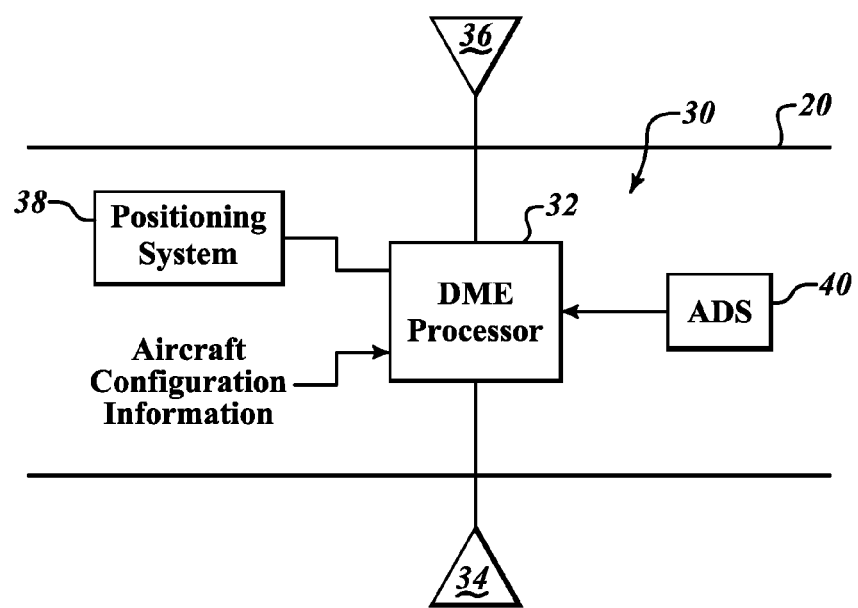
FIG. 2 is a block diagram of an exemplary system formed in accordance with an embodiment of the present invention.

FIGS. 1 and 2 illustrate an aircraft 20 with a lower fuselage-mounted distance-measuring equipment (DME) antenna 34 and an upper fuselage-mounted DME antenna 36. A DME processor 32 is in signal communication with the antennas 34, 36. In one embodiment, the DME processor 32 analyzes the signal received from the currently active DME antenna 34 or 36 and aircraft information. Based on the analysis, the DME processor 32 may switch DME communications to the non-active DME antenna 34 or 36.

The aircraft 20 also includes a positioning system 38 (e.g., GPS, INS), an air data system (ADS) 40, and a memory device 42. The positioning system 38 provides aircraft location information to the DME processor 32. The ADS 40 provides aircraft orientation/attitude information (such as pitch, roll, yaw) to the DME processor 32. The DME processor 32 also receives aircraft configuration information (e.g., landing gear position) from an aircraft databus coupled to configured sensors/controllers or some other source. The memory device 32 stores ground station information (e.g., location, altitude).

Figure 3:
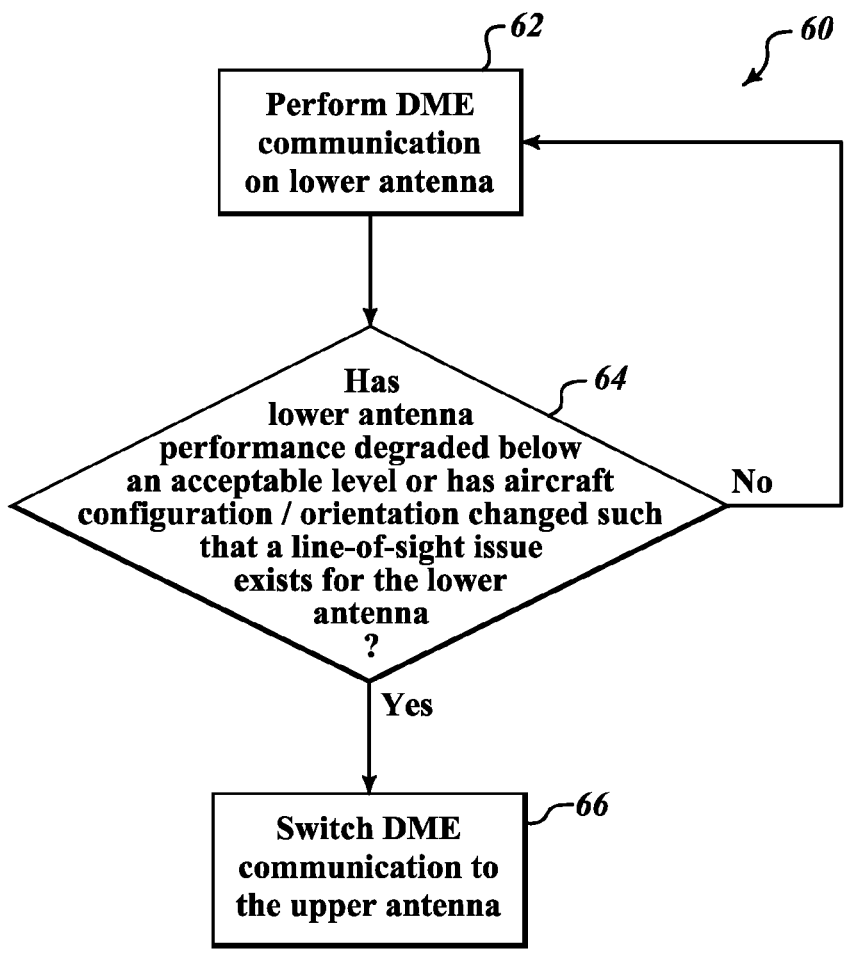
FIG. 3 is a flowchart of an exemplary process performed by the system shown in FIG. 2.

FIG. 3 illustrates an exemplary process 60 performed by the DME processor 32. First, at a block 62, DME communications are provided via one of the antennas 34, 36. Typically, the lower antenna 34 is the default antenna because DME communications are most likely with a ground station 22. At a block 64, aircraft and ground station position information is received at the processor 32. The aircraft position information is received from the positioning system 38 and the ground station position information is retrieved from the memory device 42, based on knowledge about which ground station is currently communicating with the aircraft. The ground station knowledge may be provided by an identification signal sent from the ground station to a communication device.

Then, at a block 66, the processor 32 receives aircraft orientation information from the ADS 40 or other comparable device. At a block 68, the processor 32 receives aircraft configuration information from a databus or some other source that has knowledge of the aircraft configuration (e.g., landing gear position). Next, at a decision block 70, the processor 32 analyzes the signals (i.e., strength) received from the lower antenna 34 to determine if the strength of the signals has fallen below an acceptable level and/or determines whether, based on the position information and aircraft's orientation and/or configuration information, a line-of-sight issue exists. A line-of-sight issue is one where an obstacle (e.g., landing gear, landing gear doors, fuselage, wings, etc.) comes between the antenna and the ground station.

If the antenna's performance has been determined to have fallen below the acceptable level or the aircraft's orientation/configuration indicates a line-of-sight issue, based on the received/retrieved information, then, at a block 74, DME communication is switched to the upper (other) antenna 36. Otherwise, the DME communication does not change antennas.

In one embodiment, the analysis performed by the DME processor 32 uses ownship's position information, ownship's attitude, and DME ground station position information to select the most appropriate antenna with the least obstructed or most unobstructed "view" to the ground stations.

The signal analysis described above can be done by monitoring the health of the lower antenna (e.g., continuity check using DC voltage). Avionics antennas typically have a resistor to ground on their RF input for continuity checking to ensure system integrity. The DME in this case would source a DC current on the antenna cable center conductor and look for a DC voltage. If it is 0V then the antenna or cables is shorted to ground. If it is greater than some previously determined voltage then the antenna or cables is open circuited.

In one embodiment, the processor 32 monitors the received signal's strength and reply efficiency to different DME ground stations and selects the antenna that provides the greatest reply efficiency or the greatest signal strength.

In one embodiment, the line-of-sight analysis is combined with a current signal strength for the currently operating antenna. For example, if the lower antenna is being used and a line-of-sight issue arises due to deployment of the landing gear, then a switch of DME communication to the upper antenna occurs only when the strength of the DME signal received at the lower antenna drops below a threshold value.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
    receiving, by a processing device, aircraft position information;
    receiving, by the processing device, distance-measuring equipment (DME) ground station position information;
    receiving, by the processing device, at least one of aircraft configuration or orientation information;
    determining, by the processing device, if a DME signal communication issue exists with a first antenna based on the aircraft position information, the DME ground station position information, and the at least one of the aircraft configuration information or the orientation information; and
    switching DME signal communication to a second antenna if the DME signal communication issue has been determined to exist.

2. The method of claim 1, wherein the first antenna is located on a lower surface of a fuselage of the aircraft.

3. The method of claim 2, wherein the second antenna is located on an upper surface of the fuselage of the aircraft.

4. The method of claim 1, wherein the DME signal communication issue comprises an interruption in line of sight between the first antenna and a DME ground station.

5. The method of claim 1, wherein the aircraft configuration information comprises landing gear position information.

6. The method of claim 1, wherein the orientation information comprises at least one of pitch, roll, or yaw information.

7. The method of claim 1, further comprising determining signal strength of DME signals received at the first antenna,
    wherein switching switches the DME signal communication to the second antenna if the DME signal communication issue has been determined to exist and the determined signal strength of the DME signals is greater than a predefined threshold.

8. The method of claim 1, further comprising:
    receiving, at the first antenna, a DME signal from a ground station;
    determining, by the processing device, if the received DME signal is greater than a predefined threshold; and
    disabling the reception of DME signals at the first antenna and receiving the DME signals at the second antenna if the received DME signal is determined to not be greater than the predefined threshold.

9. A system located on an aircraft, the system comprising:
    an aircraft configuration data source configured to generate aircraft configuration information;
    an aircraft orientation data source configured to generate aircraft orientation information;
    a positioning system configured to generate aircraft position information;
    a component configured to provide distance-measuring equipment (DME) ground station position information;
    a first antenna;
    a second antenna; and
    a processing device configured to:
        determine if a DME signal communication issue exists with the first antenna based on the generated aircraft position information, the DME ground station position information, and at least one of the aircraft configuration information or the aircraft orientation information; and
        switch DME signal communication to the second antenna if the DME signal communication issue has been determined to exist.

10. The system of claim 9, wherein the first antenna is located on a lower surface of a fuselage of the aircraft.

11. The system of claim 10, wherein the second antenna is located on an upper surface of the fuselage of the aircraft.

12. The system of claim 9, wherein the DME signal communication issue comprises an interruption in line of sight between the first antenna and a DME ground station.

13. The system of claim 9, wherein the aircraft configuration information comprises landing gear position information.

14. The system of claim 9, wherein the orientation information comprises at least one of pitch, roll, or yaw information.

15. The system of claim 9, wherein the processing device is further configured to determine signal strength of DME signals received at the first antenna,
    wherein the processing device switches the DME signal communication to the second antenna if the DME signal communication issue has been determined to exist and the determined signal strength of the DME signals is greater than a predefined threshold.

16. A system comprising:
    a means for receiving aircraft position information;
    a means for receiving distance-measuring equipment (DME) ground station position information;
    a means for receiving at least one of aircraft configuration or orientation information;
    a means for determining if a DME signal communication issue exists with a first antenna based on the aircraft position information, the DME ground station position information, and the at least one of the aircraft configuration information or the orientation information; and
    a means for switching the DME signal communication to a second antenna if the DME signal communication issue has been determined to exist.

17. The system of claim 16, wherein the first antenna is located on a lower surface of a fuselage of the aircraft and the second antenna is located on an upper surface of the fuselage of the aircraft.

18. The system of claim 16, wherein the DME signal communication issue comprises an interruption in line of sight between the first antenna and a DME ground station.

19. The system of claim 16, wherein the aircraft configuration information comprises landing gear position information and at least one of pitch, roll, or yaw information.

20. The system of claim 16, further comprising a means for determining signal strength of DME signals received at the first antenna,
  wherein the means for switching switches the DME signal communication to the second antenna if the DME signal communication issue has been determined to exist and the determined signal strength of the DME signals is greater than a predefined threshold.

* * * * *